United States Patent [19]

Chambers, Jr.

[11] 3,828,139

[45] Aug. 6, 1974

[54] DISCONNECT CIRCUIT FOR TELEPHONE SYSTEMS

[75] Inventor: Charles W. Chambers, Jr., Amherst, Ohio

[73] Assignee: Lorain Products Corporation, Lorain, Ohio

[22] Filed: Oct. 24, 1972

[21] Appl. No.: 299,924

[52] U.S. Cl. .......... 179/16 F

[51] Int. Cl. .......... H04m 3/24, H04b 3/46

[58] Field of Search .......... 179/16 F, 175.3, 175.31 R

[56] References Cited

UNITED STATES PATENTS

| | | | |
|---|---|---|---|
| 3,339,027 | 8/1967 | Feiner et al. | 179/16 F |
| 3,453,392 | 7/1969 | Zebe | 179/16 F |
| 3,671,676 | 6/1972 | Henry et al. | 179/16 F |
| 3,689,704 | 9/1972 | Wadding | 179/16 F |

OTHER PUBLICATIONS

F. T. Andrews Jr., "Customer Lines Go Electronic," Bell Labs. Record, Feb. 1972, Vol. 50, No. 2, pages 59–65.

*Primary Examiner*—Kathleen H. Claffy
*Assistant Examiner*—Randall P. Myers
*Attorney, Agent, or Firm*—Edward C. Jason

[57] ABSTRACT

A circuit for automatically disconnecting circuitry such as voltage booster circuitry from a subscriber line to prevent such circuitry from interfering with the measurement of voltage and current on that line. The circuit includes booster disconnect switches which, in a first operative state, connect the voltage booster circuitry in aiding relationship to current flow through the subscriber line and which, in a second operative state, disconnect the voltage booster circuitry from the line and substitute therefore one or more current bypass conductors. A control circuit responsive to both the voltage across and current through the line controls the disconnect switches, as required, to establish the first operative state thereof when the subscriber line is being used by a subscriber and to establish the second operative state thereof when the subscriber line is being tested in either a high voltage-low current mode or a low voltage-high current mode.

14 Claims, 2 Drawing Figures

DISCONNECT CIRCUIT FOR TELEPHONE SYSTEMS

BACKGROUND OF THE INVENTION

The present invention relates to a disconnect circuit for use in connection with circuitry such as telephone system voltage booster circuits and is directed more particularly to a circuit for connecting and disconnecting voltage booster circuits both in response to predetermined voltage conditions and in response to predetermined current conditions in the telephone system.

An important consideration in the provision of telephone service is the maintenance of an adequate d-c current flow in each subscriber line. This subscriber line current performs a variety of telephone system operations including the operation of a dialing relay during dialing and the operation of a trip relay to terminate the ringing sound when the called party's receiver is lifted. If the subscriber line current is of insufficient magnitude, the above-named relays and others will fail to operate and the telephone set or sets connected to that subscriber line will be useless.

The difficulty in establishing adequate d-c current flow in each of a multiplicity of subscriber lines is that each subscriber line has a d-c resistance which depends upon the length of that line. For economic reasons it has been found advantageous to energize the majority of subscriber lines from a central office battery of generally adequate terminal voltage, and to provide a plurality of voltage booster circuits which increase the voltage applied to those subscriber lines having resistances, due for instance to excessive loop lengths, too high to operate directly from the central office battery. These voltage booster circuits are arranged to add a d-c boost voltage in series-aiding relationship between the central office battery and respective subscriber lines.

Because of the widespread use of reverse battery supervision, that is, the use of reversals in the polarity with which central office battery is applied to a subscriber line, for supervisory or control purposes, a voltage booster source which is connected in series-aiding relationship to the subscriber line current for one central office battery polarity is in series opposition and, therefore, in voltage reducing relationship to the subscriber line current for the opposite central office battery polarity. In order to overcome this problem, and maintain a series aiding relationship, various voltage booster circuits have been developed which coordinate the polarity of the serially added boost voltage with the then polarity of the central office battery so as to assure a continuous series-aiding relationship therebetween.

In maintaining subscriber lines, including those which are serviced by voltage booster circuits, it is necessary to apply test voltages and currents to the line to measure the electrical characteristics thereof. Because the voltage booster circuitry can affect the magnitudes of the test voltages and currents, the voltage booster circuitry, when present, must be manually disabled or disconnected, during testing, to assure accurate test results. In central offices having large numbers of voltage boosters which service lines that must be tested on a regular basis, the disabling or disconnecting of the voltage boosters has been time consuming and expensive.

Routine subscriber line tests may be an open circuit test in which relatively high voltages are applied to the line producing relatively low currents or a short circuit test in which relatively low voltages are applied producing relatively high currents. The circuit of the invention accommodates both of these conditions.

In accordance with the present invention, there is provided highly effective circuitry which allows subscriber lines to be tested without manually removing the voltage booster circuits servicing them, which operates automatically upon the mere application of the central office test equipment, which is usable in connection with high voltage-low current line tests as well as low voltage-high current line tests, and which can be used with voltage booster circuits of existing types.

SUMMARY OF THE INVENTION

It is an object of the invention to provide test-through type circuitry for facilitating the testing of subscriber lines which are serviced by voltage booster circuits.

An important object of the invention is to provide test-through circuitry which operates in the desired manner both in the presence of high voltage-low current line testing and in the presence of low voltage-high current line testing.

Another object of the invention is to provide circuitry of the above character which operates satisfactorily in the presence of a variety of types of voltage booster circuits and a variety of types of telephone systems.

Other objects and advantages of the invention will become apparent from the following description and accompanying drawings.

DESCRIPTION OF THE INVENTION

Figures 1, 2:
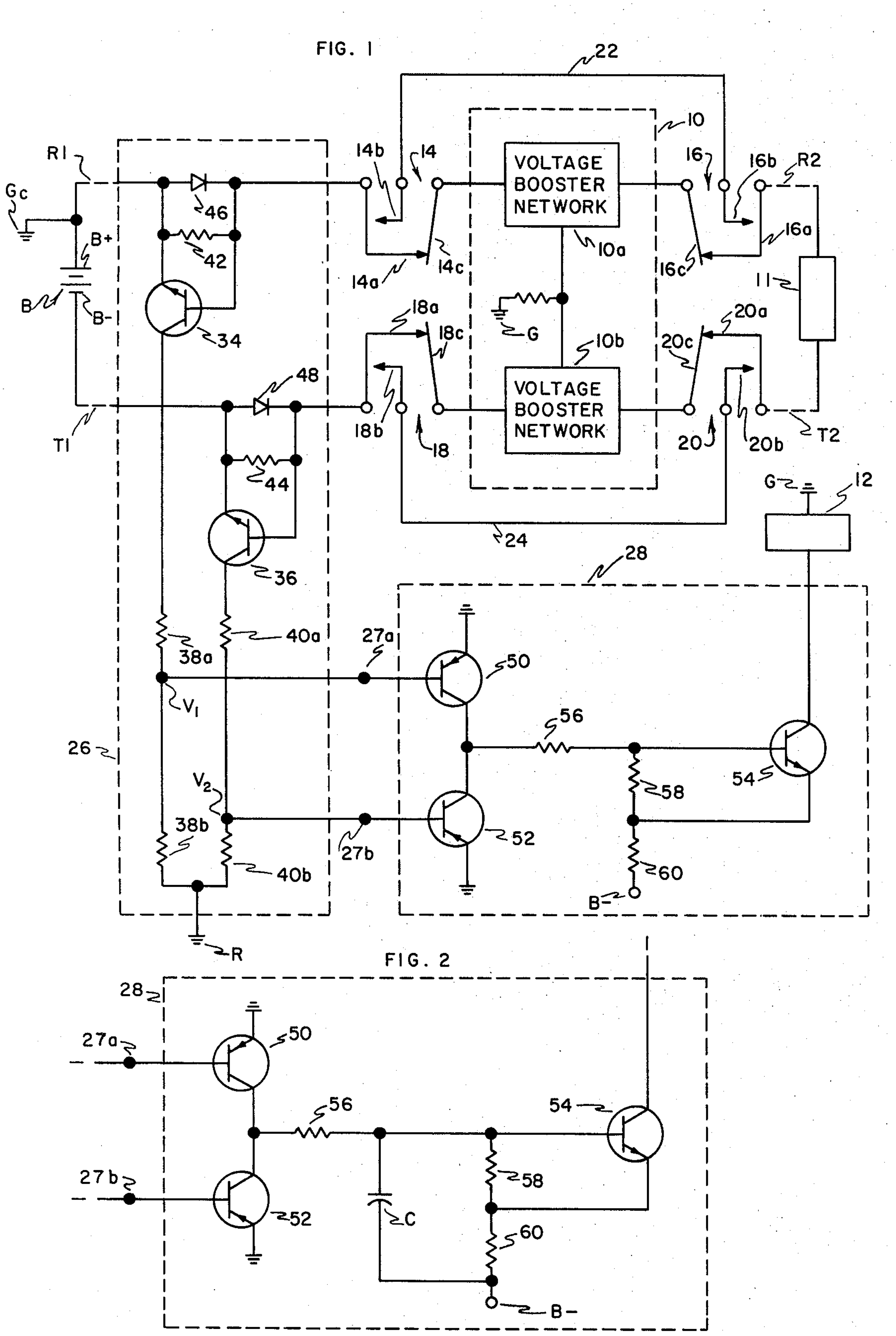
FIG. 1 is a schematic diagram of one exemplary circuit embodying the invention.
FIG. 2 is a fragmentary schematic diagram of a modified portion of the circuit of FIG. 1.

Referring to FIG. 1 there is shown a voltage booster circuit 10 for increasing the d-c operating voltage which a central office battery B applies to the conductors $R_1$–$R_2$ and $T_1$–$T_2$ of a subscriber line and thereby providing a boosted d-c operating current to a subscriber telephone set 11. Booster circuit 10 includes voltage booster networks **10*a* and 10*b* which serve to insert into subscriber line conductors $R_1$–$R_2$ and $T_1$–$T_2$, respectively, d-c boost voltages which additively increase the d-c operating current which battery B supplies to subscriber set 11, in spite of supervisory reversals in the polarity with which battery B is applied to the subscriber line. The circuitry included within booster networks 10*a* and 10*b*** is described in detail in the U.S. patent of Charles W. Chambers, Jr., Ser. No. 3,639,696, entitled Multi-State Voltage Booster Circuit for Telephone Systems. It will be understood, however, that the circuitry of the invention is contemplated for use in connection with any type of voltage booster circuit and, in addition, with auxiliary telephone circuitry other than a voltage booster circuit.

To the end that voltage booster networks **10*a* and 10*b* may be connected to subscriber line conductors $R_1$–$R_2$ and $T_1$–$T_2$ during normal telephone usage, and may be disconnected therefrom during line testing, there is provided the test-through circuitry of the present invention. In the present illustrative embodiment, the test-through circuitry includes switching means which here takes the form of a relay having a coil 12 and make-before-break contacts 14, 16, 18 and 20. These contacts serve to connect voltage booster networks 10***a* and 10*b* between battery B and subscriber set 11 to assure that booster networks 10*a* and 10*b* aid the flow of subscriber line current when the subscriber set 11 is being used by a subscriber, that is, when the subscriber line is being energized by central office battery B. These contacts also disconnect booster networks 10*a* and 10*b* and insert bypass conductors 22 and 24 in place thereof to assure that booster networks 10*a* and 10*b* do not interfere with line voltage and current measurements made during line testing, that is, when the subscriber line is energized by a line test source in either the open-circuit or short-circuit test configurations.

When, for example, central office battery B is connected to conductors $R_1$ and $T_1$ with the polarity shown in FIG. 1, battery B energizes subscriber set 11 through booster networks 10*a* and 10*b* and through relay contact pairs 14*a*–14*c*, 16*a*–16*c*, 18*a*–18*c*, 20*a*–20*c*. Similarly, when battery B is connected to conductors $R_1$ and $T_1$ with a polarity reversed from that shown in FIG. 1, battery B energizes subscriber set 11 through booster networks 10*a* and 10*b* and through relay contact pairs 14*a*–14*c*, 16*a*–16*c*, 18*a*–18*c* and 20*a*–20*c*. Under either condition, voltage booster networks 10*a* and 10*b* additively increase the current which central office battery B supplies to subscriber station 11 through subscriber line conductors $R_1$–$R_2$ and $T_1$–$T_2$. This is the first or boost voltage producing state of the circuit of the invention.

When, however, subscriber line conductors $R_1$ and $T_1$ are energized by a central office line test source, in either a high voltage-low current test mode (open-circuit test) or a low voltage-high current test mode (short-circuit test), relay contact pairs 14*a*–14*b*, 16*a*–16*b*, 18*a*–18*b* and 20*a*–20*b* close to disconnect voltage booster networks 10*a* and 10*b* and bypass the latter through conductors 22 and 24 which then provide a direct metallic path between conductors $R_1$ and $R_2$ and $T_1$ and $T_2$. This disconnecting and bypassing activity assures that accurate voltage and current measurements may be made on the subscriber line without regard to the electrical characteristics of booster networks 10*a* and 10*b*. This is the second or non-boost voltage producing state of the circuit of the invention.

Because contacts 14, 16, 18 and 20 are of the make-before-break type, the subscriber line current which flows through the subscriber line, through voltage booster circuit 10, when coil 12 is energized is not interrupted by the de-energization of that coil. This is because the subscriber line current which flows through booster 10 before coil 12 is de-energized is shifted to bypass conductors 22 and 24 as coil 12 is de-energized. Similarly, subscriber line current which flows through bypass conductors 22 and 24 before relay coil 12 is energized is not interrupted by the energization of that coil. This is because the current which flows through bypass conductors 22 and 24 before the energization of coil 12 is shifted to booster networks 10*a* and 10*b* as coil 12 is energized. Consequently, the test-through circuitry of the invention does not prevent the operation of telephone system relays which must hold a subscriber line into contact with a central office as, for example, relays which must hold a line during certain types of automatic number identification. Thus, the circuit of the invention can be used in telephone systems having a variety of types of switchgear.

Included in the test procedure which is performed in the course of routine subscriber line testing is either an open-circuit test, that is, a test whereby relatively high voltages are applied to the subscriber line and produce relatively low currents, or a short-circuit test, that is, a test whereby relatively low voltages are applied to the subscriber line and produce relatively high currents. Both of these test conditions differ from the normal telephone system operating condition in that in the presence of the latter both the voltage across and current through the subscriber line are relatively high. As will be described more fully presently, the circuit of the invention detects these differences and controls relay 12, in accordance therewith to assure that booster networks 10*a* and 10*b* are connected in aiding relationships to the subscriber line current during normal telephone system operation and are disconnected and bypassed during either mode of subscriber line testing.

To the end that the operative state of the above described disconnect circuitry may be controlled in accordance with the voltage across and also the current through the subscriber line, there is provided voltage and current sensing network 26 and a disconnect control network 28. Sensing network 26 senses the magnitude of current flow in each subscriber line conductor and varies the voltages at sensing network outputs 27*a* and 27*b* in accordance therewith to provide a current responsive input to control network 28. Sensing network 26 also senses the voltage between a reference terminal R which may be at the potential of ground G and each subscriber line conductor and controls the voltages at sensing network outputs 27*a* and 27*b* in accordance therewith to provide a voltage responsive input to control network 28. Control network 28, in turn, senses the voltages at sensing network outputs 27*a* and 27*b* and energizes relay 12 only if the latter voltages indicate that the central office battery is producing normal d-c operating current in the subscriber line. Thus, the operative state of disconnect relay 12 is dependent upon both the voltage across and current through the subscriber line, as reflected by the voltages at sensing network outputs 27*a* and 27*b*.

Further in accordance with the present invention, voltage and current sensing network 26 and control network 28 are arranged to energize relay coil 12 when the voltage applied to either subscriber line conductor is within a predetermined voltage range which includes the central office battery voltage and when the current through the subscriber line is within a predetermined current range which includes the normal d-c operating current of the subscriber line. Networks 26 and 28 are also arranged to deenergize relay coil 12 when either the voltages applied to the subscriber line conductors or the currents therethrough are not within the above-mentioned predetermined voltage and current ranges. Accordingly, it will be seen that by selecting the above voltage and current ranges so that either the voltage or current produced by a line test source is not included therein, booster networks 10*a* and 10*b* may be connected in aiding relationship to the subscriber line current under normal operating conditions and may be disconnected and bypassed during test conditions.

In the present embodiment, sensing network 26 includes first and second variable conducting means which here take the form of NPN transistors 34 and 36, respectively, and first and second voltage divider networks which include resistor pairs 38a and 38*b* and 40*a* and 40*b*, respectively. The base-emitter control circuits of transistors 34 and 36 are connected in current conducting relationship to subscriber line conductors $R_1$ and $T_1$, respectively, to assure that the currents which transistors 34 and 36 draw through voltage dividers 38*a*–38*b* and 40*a*–40*b*, respectively, vary with the current flowing in subscriber line conductors $R_1$ and $T_1$, respectively. The collector-emitter power circuits of transistors 34 and 36 are, in turn, connected in series with voltage dividers 38*a*–38*b* and 40*a*–40*b*, respectively, across the source which energizes conductors $R_1$ and $T_1$, that is, between reference terminal R and central office ground $G_C$. This assures that the current through voltage dividers 38*a*–38*b* and 40*a*–40*b* also varies with the voltage of the source which produces current flow in subscriber line conductors $R_1$ and $T_1$. Thus, transistors 34 and 36 serve as current sensing elements and transistors 34 and 36 together with voltage dividers 38*a*–38*b* and 40*a*–40*b*, respectively, serve as voltage sensing elements.

When, for example, central office battery B is connected to the subscriber line with the polarity shown in FIG. 1, the current through resistors 40*a* and 40*b* varies both in accordance with the subscriber line current through conductor $T_1$ and in accordance with the voltage which battery B applies to conductor $T_1$. When, on the other hand, battery B is connected to the subscriber line with a polarity opposite to that shown in FIG. 1, the current through resistors 38*a* and 38*b* varies both as a function of the subscriber line current through conductor $R_1$ and in accordance with the voltage which battery B applies to conductor $R_1$. Similar relationships between the currents through voltage dividers 38*a*–38*b* and 40*a*–40*b* and the subscriber line voltage and current exist when a line test source is connected to subscriber line conductors $R_1$ and $T_1$. Accordingly, it will be seen that the voltages between reference terminal R and voltage divider taps $V_1$ and $V_2$ are each functions of both the voltage of and current through respective conductors of the subscriber line.

To the end that sensing network 26 may produce low voltages at outputs 27*a* and 27*b* when the magnitude of the subscriber line current is less than any current in the above described predetermined current range, resistors 42 and 44 are connected across the base-emitter control circuits of transistors 34 and 36, respectively, to establish current thresholds for conduction therethrough.

When, for example, conductors $R_1$ and $T_1$ are energized by office battery B and telephone set 11 conducts d-c operating current, that is, during normal telephone operation, the current in conductors $R_1$ and $T_1$ is sufficient to establish across resistor 42 or 44, a voltage sufficient to cause base-emitter conduction through transistor 34 or 36, respectively, depending upon the polarity with which battery B is connected to the subscriber line. Under these conditions, transistor 34 or 36 controls the voltage of points 27*a* or 27*b*, respectively, in accordance with the current through the subscriber line.

When, however, the subscriber line is energized for testing purposes by a central office line test source, such as, for example, during a high voltage-low current test, the subscriber line current through resistor 42 or 44 is insufficient to cause base-emitter conduction through either transistor 34 or transistor 36. Under these conditions, the voltages at points 27*a* and 27*b* are not controlled in accordance with the subscriber line current. Thus, resistors 42 and 44 establish current criteria for distinguishing between a condition in which the subscriber line is energized by central office battery B for normal telephone operation and a condition in which the subscriber line is energized for testing purposes by a central office line test source which produces a low level of subscriber line current, for instance, the current produced during the open-circuit line test.

To the end that transistor 34 and resistor 42 do not impede the flow of d-c operating current through telephone set 11 when the latter flows away from battery B through conductor $R_1$, a diode 46 is connected across transistor 34 and resistor 42. This diode bypasses the subscriber line current around then non-conducting transistor 34 so that it can control the then conducting transistor 36. Similarly, to the end that transistor 36 and resistor 44 do not impede the flow of d-c operating current through telephone set 11 when the latter flows away from the battery B through conductor $T_1$, a diode 48 is connected across transistor 36 and resistor 44. This diode bypasses the subscriber line current around the then non-conducting transistor 36 so that it can control then conducting transistor 34. Accordingly, whether current flows in one direction or the other in the subscriber line, either transistor 34 or transistor 36 will conduct to control the voltage at point 27*a* or 27*b*, respectively, in accordance with the magnitude of the subscriber line current. Thus, sensing network 26 provides a current flow indication without regard to the polarity with which the central office battery is applied to the subscriber line.

As previously described, voltage dividers 38*a*–38*b* and 40*a*–40*b* are connected between reference terminal R (ground) and central office ground $G_C$, through transistors 34 and 36, respectively, so that the voltages between reference terminal R and points 27*a* and 27*b* vary not only with the magnitude of the subscriber line current but also with the magnitude of the voltage between conductors $R_1$ and $T_1$. As a result, the voltage between reference terminal R and point 27*a* or 27*b* will be greater when central office battery B establishes a subscriber line current sufficient to establish conduction in transistor 34 or 36 than when a line test source of substantially lower terminal voltage establishes such conduction therein. Thus, voltage dividers 38*a*–38*b* and 40*a*–40*b* establish voltage criteria for distinguishing between a condition in which the subscriber line is energized by central office battery B and a condition in which the subscriber line is energized by a central office line test source which produces a low subscriber line voltage, for instance, the voltage used during the short-circuit line test.

In accordance with the present invention, the above described current and voltage criteria are utilized to establish the first operative state of disconnect relay 12 under normal telephone system operating conditions and to establish the second operative state of relay 12 under line testing conditions as will now be explained. As previously described, subscriber line testing is accomplished with either a relatively high voltage and a relatively low current or with a relatively low voltage and a relatively high current. As a result, the control voltages which appear at points 27*a* and 27*b* during either line test are both substantially less than the control voltage which appears at those points during normal telephone system operation when both line voltage and line current are relatively high.

To the end that the above control voltages may be utilized to energize coil 12, during normal telephone operation, and to de-energize coil 12 during subscriber line testing, there is provided control network 28. In the present embodiment, control network 28 includes variable conducting means which here take the form of PNP transistors 50 and 52. These transistors are connected so that the control voltages appearing between reference terminal R and points *27a* and *27b* are applied across the respective base-emitter control circuits thereof and so that the emitter-collector power circuits thereof are each connected in energizing relationship to relay coil 12 through relay drive transistor 54 and resistors 56, 58 and 60. In other words, transistors 50 and 52 are connected in an "OR" type control configuration between sensing network outputs *27a* and *27b* and relay coil 12.

To the end that relay coil 12 may be energized only when the voltage at either point *27a* or *27b* is high enough to indicate that the subscriber line is not being tested, the resistances comprising voltage dividers *38a–38b* and *40a–40b* are so proportioned that the voltages at points *27a* and *27b* rise above the forward breakdown voltages of the base-emitter junctions of transistors 50 and 52 only when the voltage of and current through one or the other of the subscriber line conductors indicates both the presence of battery B and the presence of normal operating current flow. Thus, transistor 50 or 52 conducts to energize coil 12 when the subscriber line is being used by a subscriber and are both nonconducting to de-energize coil 12 when the subscriber line is being tested.

In telephone systems wherein the dialing function is accomplished by means of dial pulses comprising interruptions in the subscriber line current, it may or may not be desirable to have contacts 14 through 18 open and close in response to each dial pulse. If such dial pulse following action is desirable, it may be afforded by selecting a suitably fast operating relay for use in the circuit of FIG. 1. If, on the other hand, such dial pulse following activity is not desirable, it may be prevented by modifying control network 28 as shown in FIG. 2, that is, by connecting across resistors 58 and 60 a capacitor C having a capacity large enough to delay the operation of the disconnect relay for a time equal to or longer than the duration of a dial pulse.

In view of the foregoing, it will be seen that a test-through circuit constructed in accordance with the invention is adapted to sense both the voltage applied to the subscriber line and the current therethrough and to control the connections of a voltage booster circuit in accordance with whether the magnitude of the voltage and current are indicative of normal subscriber line usage or of subscriber line testing.

It will be understood that the above the above embodiment is for illustrative purposes only and may be changed or modified without departing from the spirit and scope of the appended claims.

What is claimed is:

1. In a test-through circuit for operation in connection with a subscriber line having a voltage booster circuit, said voltage booster circuit having first terminal means for connection to a central office and second terminal means for connection to a subscriber line, in combination, switching means for controlling the connections of the voltage booster circuit to the central office and the subscriber line, said switching means having a first state in which the first and second terminal means are connected between the central office and the subscriber line and having a second state in which at least one bypass conductor is connected between the central office and the subscriber line, current sensing means for controlling the state of said switching means in accordance with the magnitude of d-c current flow in each conductor of the subscriber line, said current sensing means having a first state when the current in either conductor of the subscriber line is approximately equal to the normal d-c operating current thereof and having a second state when the currents in both conductors of the subscriber line are substantially less than said normal d-c operating current, a reference terminal, voltage sensing means for controlling the state of said switching means in accordance with the magnitude of the d-c voltage applied to the subscriber line, said voltage sensing means having a first state when the voltage between either conductor of the subscriber line and said reference terminal is approximately equal to the normal d-c operating voltage of the subscriber line and having a second state when the voltage between each conductor of the subscriber line and said reference terminal is substantially less than said normal d-c operating voltage, means for connecting said current sensing means between the central office and the subscriber line, means for connecting said voltage sensing means between the conductors of the subscriber line and said reference terminal, and means for connecting said current and voltage sensing means to said switching means to establish the first state thereof when said current and voltage sensing means are in their first states.

2. A circuit as set forth in claim 1 in which said switching means comprises a relay having a plurality of make-before-break contacts.

3. A circuit as set forth in claim 1 including delay means for introducing a time delay in the establishment of the second state of said switching means, said time delay being equal to or greater than the duration of a dial pulse.

4. In a test-through circuit for operation in connection with a subscriber line having a voltage booster circuit, said voltage booster circuit having first terminal means for connection to a central office and second terminal means for connection to a subscriber line, in combination, switching means for controlling the connections of the voltage booster circuit to the central office and the subscriber line, said switching means having a first state in which the first and second terminal means connected between the central office and the subscriber line and having a second state in which at least one bypass conductor is connected between the central office and the subscriber line, a reference terminal, sensing means for controlling the operative state of said switching means in accordance with the d-c voltage between each conductor of the subscriber line and said reference terminal and in accordance with the current through each conductor of the subscriber line, said sensing means establishing the first operative state of said switching means when the d-c voltage between any conductor of the subscriber line and said reference terminal is approximately equal to the normal d-c operating voltage of the subscriber line and the current in the same conductor of the subscriber line is approximately equal to the normal d-c operating current of the subscriber line, and establishing the second operative state of said switching means either when the d-c voltage between each conductor of the subscriber line and said reference terminal is substantially less than said normal d-c operating voltage or when the current through each conductor of the subscriber line is substantially less than said normal d-c operating current, said sensing means having current sensing input means connected between the central office and the subscriber line and voltage sensing input means connected between the conductors of the subscriber line and said reference terminal.

5. In a test-through circuit for operation in connection with a subscriber line having a voltage booster circuit, said voltage booster circuit having a first set of terminals for connection to a central office and a second set of terminals for connection to a subscriber line, in combination, switching means for controlling the connections of the voltage booster circuit to the central office and the subscriber line, said switching means having a first state in which the first and second sets of terminals are connected between the central office and the subscriber line and having a second state in which bypass conductors are connected between the central office and the subscriber line, control means for controlling the operative state of said switching means in accordance with the voltage applied to and current through the subscriber line, first means for energizing said control means in accordance with the d-c current in each conductor of the subscriber line, second means for energizing said control means in accordance with the d-c voltage applied to each conductor of the subscriber line, means for connecting said first means between the central office and each conductor of the subscriber line to sense the presence of normal d-c operating current therebetween, means for connecting said second means between each conductor of the subscriber line and a reference terminal to sense the presence of normal d-c operating voltage therebetween, said control means serving to establish the first state of said switching means when the voltage and current on any conductor are within normal d-c operating limits and for establishing the second state of said switching means when either the voltage or the current on both conductors are not within said normal d-c operating limits.

6. A circuit as set forth in claim 5 including means for bypassing current around the voltage booster circuit when said switching means is in its second state.

7. A circuit as set forth in claim 5 in which said switching means comprises a relay having a plurality of make-before-break contacts.

8. A circuit as set forth in claim 5 including delay means for introducing a time delay in the establishment of the second state of said switching means, said time delay being equal to or longer than the duration of a dial pulse.

9. In a test-through circuit for operation in connection with a subscriber line having a voltage booster circuit, said voltage booster circuit having first terminal means for connection to a central office and second terminal means for connection to a subscriber line, in combination switching means for controlling the connections of the voltage booster circuit to the central office and the subscriber line, said switching means having a first state in which the first and second terminal means are connected between the central office and the subscriber line and having a second state in which at least one bypass conductor is connected between the central office and the subscriber line, first and second variable conducting means for establishing currents which vary in accordance with the currents in respective conductors of the subscriber line, said variable conducting means having control circuit means and power circuit means, means for connecting said control circuit means between the central office and the subscriber line, a reference terminal, first and second resistance means for establishing control voltages which are proportional to the magnitude of current flow therethrough, means for connecting said resistance means and said power circuit means in series between said reference terminal and respective conductors of the subscriber line, control means for controlling the operative state of said switching means in accordance with the magnitudes of the control voltages established by said first and second resistance means.

10. A circuit as set forth in claim 9 including first and second bypass diodes and means for connecting said bypass diodes across the control circuits of respective variable conducting means.

11. In a test-through circuit for operation in connection with a subscriber line having a voltage booster circuit, said voltage booster circuit having first terminal means for connection to a central office and second terminal means for connection to a subscriber line, in combination, switching means for controlling the connections of the first and second terminal means the central office and the subscriber line, said switching means having a first state in which the first and second terminal means are connected between the central office and the subscriber line and having a second state in which at least one bypass conductor is connected between the central office and the subscriber line, control means for controlling the operative state of said switching means in accordance with the voltage of and current through each conductor of the subscriber line, a plurality of current sensing means for sensing the magnitude of current flow in respective conductors of the subscriber line, each of said current sensing means having a first state when the current in the respective conductor of the subscriber line is approximately equal to the normal d-c operating current of the subscriber line and a second state when the current in the respective conductor of the subscriber line is substantially less than said normal d-c operating current, a reference terminal, a plurality of voltage sensing means for sensing the magnitude of the voltage between said reference terminal and respective conductors of the subscriber line, each of said voltage sensing means having a first state when the voltage between said reference terminal and the respective conductor of the subscriber line is approximately equal to the normal d-c operating voltage of the subscriber line and having a second state when the voltage between said reference terminal and the respective conductor of the subscriber line is substantially less than said normal d-c operating voltage, means for connecting said current and voltage sensing means to said control means, means for connecting said current sensing means between the central office and the subscriber line, means for connecting said voltage sensing means between said reference terminal and the conductors of the subscriber line, said control means being adapted to establish the first state of said switching means when the current sensing means and the voltage sensing means connected to any conductor of the subscriber line are both in their first states.

12. A circuit as set forth in claim 11 in which said switching means comprises a relay having a plurality of make-before-break contacts.

13. A circuit as set forth in claim 11 including delay means for introducing a time delay in the establishment of the second state of said switching means, said time delay being equal to or greater than the duration of a dial pulse.

14. A circuit as set forth in claim 11 in which said control means includes "OR" circuit means for combining the control signals produced by respective voltage and current sensing means.

* * * * *